United States Patent
Horchler et al.

(10) Patent No.: US 6,474,659 B1
(45) Date of Patent: Nov. 5, 2002

(54) RIDE-ON TOY INTERACTIVE PLAYSET

(75) Inventors: Jack M. Horchler, Mokena, IL (US); Stephen Leung, Central (CN)

(73) Assignee: TekNek Toys International, Inc., Mokena, IL (US)

( * ) Notice: Subject to any disclaimer, the term of this patent is extended or adjusted under 35 U.S.C. 154(b) by 0 days.

(21) Appl. No.: 09/751,134

(22) Filed: Dec. 29, 2000

(51) Int. Cl.⁷ .......................... A63G 13/00; A63H 17/36
(52) U.S. Cl. .................... 280/1.14; 280/1.202; 446/460
(58) Field of Search .............................. 280/1.13, 1.14, 280/1.189, 1.191, 1.201, 1.165, 1.16, 1.181, 1.177, 1.202, 1.174, 87.051; 446/409, 391, 422, 460, 411, 468, 29, 404, 297, 270; 296/177; 46/146, 97

(56) References Cited

U.S. PATENT DOCUMENTS

| | | | |
|---|---|---|---|
| 4,264,080 A | * | 4/1981 | Kassai ........................ 280/1.13 |
| 4,424,978 A | * | 1/1984 | Kassai ........................ 280/1.13 |
| 4,531,751 A | * | 7/1985 | Todokoro .................. 280/1.14 |
| 5,265,912 A | * | 11/1993 | Natividad ................... 296/177 |
| 5,407,216 A | * | 4/1995 | Liu ............................. 280/1.14 |
| 5,441,289 A | * | 8/1995 | Spielberger ............ 280/87.051 |
| 6,083,104 A | * | 7/2000 | Choi ........................... 463/44 |
| 6,231,056 B1 | * | 5/2001 | Wu ............................. 280/7.17 |
| 6,296,268 B1 | * | 10/2001 | Ford et al. .................. 280/648 |

OTHER PUBLICATIONS

Tek Nek International, Rescue 911 playset Ride–on and ABC Sing Along Buggy.*
Processed Plastic Co. , Tonka Electronic Ride–on.*
Tek Nek International, Play N Learn Lion Country Ride–on.*
Funrise, Fire Engine with Costume Ride–on.*

* cited by examiner

*Primary Examiner*—Brian L. Johnson
*Assistant Examiner*—Hau Phan
(74) *Attorney, Agent, or Firm*—Michael Best & Freidrich, LLC

(57) ABSTRACT

A ride-on toy resembling a vehicle, that has a dashboard and a seat compartment which contain a plurality of buttons. Each seat compartment button has a base which is removably seated within a complementary shaped opening in the seat compartment. A speech synthesizer chip responds to activation of the dashboard and seat compartment buttons by actuating a speaker to play sounds and causing an LED to flash synchronously with the sounds. The rear portion of the toy may contain a seat back which is removably attached thereto and which is sufficiently high to allow young children to use it as a support to stand and push the ride-on toy.

18 Claims, 7 Drawing Sheets

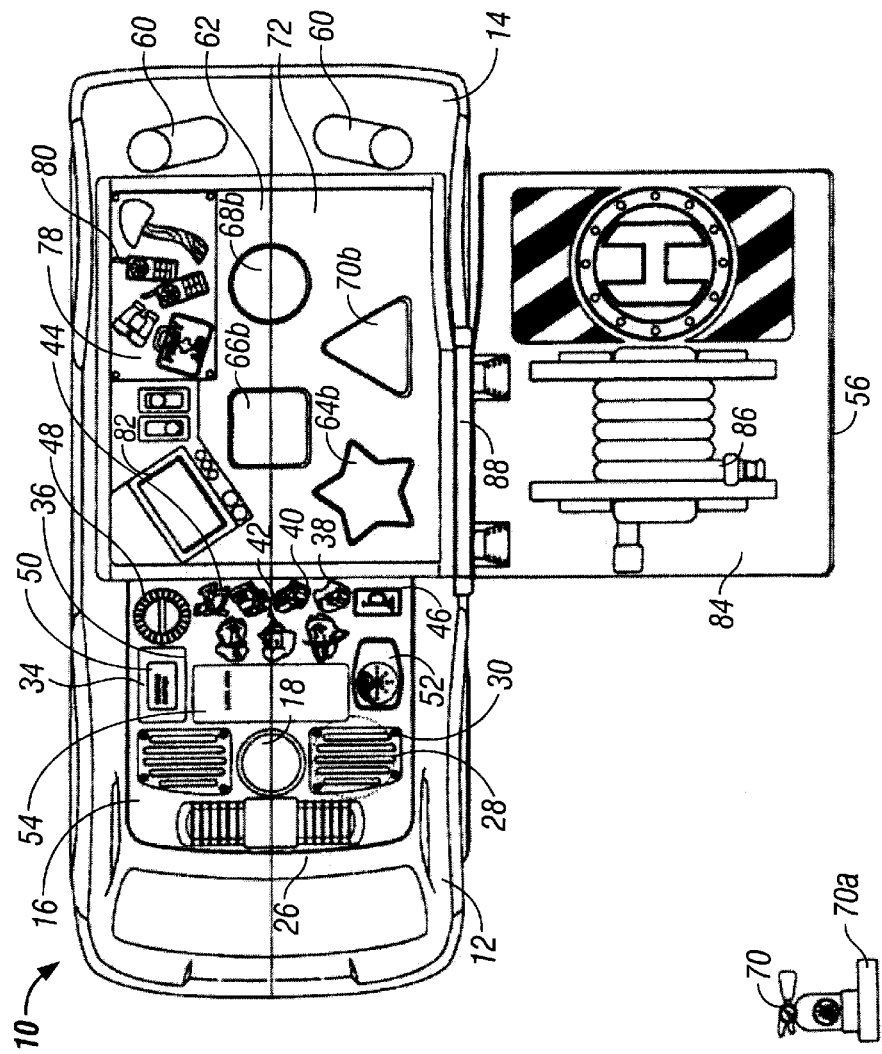
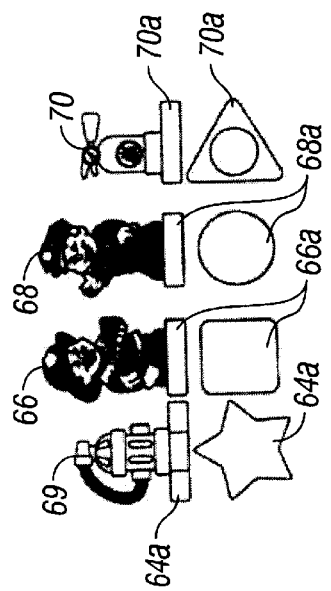
FIG. 1
FIG. 2

US 6,474,659 B1

RIDE-ON TOY INTERACTIVE PLAYSET

FIELD OF THE INVENTION

The present invention relates to ride-on toys for children and, especially, to ride-on toys resembling emergency vehicles, commercial vehicles and other vehicles, which incorporate electronic interactive playsets relating to the theme of the vehicle.

BACKGROUND OF THE INVENTION

Ride-on toys configured to resemble vehicles such as fire trucks, construction vehicles and the like, are well known in the art and allow the child to pretend that he or she is operating an actual vehicle. However, such prior art ride-on toys do not provide other characters or equipment with which the child can interact and exercise his or her imagination, and which can add teaching value to the toy.

Thus it would be desirable to enhance the play value of a ride-on toy by incorporating a playset that has other characters and equipment with which the child can interact.

SUMMARY OF THE INVENTION

These needs and other needs are satisfied by the present invention, which comprises a ride-on toy resembling a vehicle that has a front portion with a dashboard and a rear portion with a hinged cover that forms a seat and defines a seat compartment. A series of buttons are located on the dashboard and in the seat compartment. Each seat compartment button has a base that is removably seated within an opening in the seat compartment, the base of the button and the opening having complementary shapes. An electronically programmed chip in the ride-on toy operates a light emitting device and a speaker in response to activation of the buttons. Each button is shaped to resemble a person or object associated with the use or operation of the vehicle and the chip is programmed to actuate the speaker to play sounds associated with the person or object represented by the shapes of the buttons. The rear portion of the vehicle may include a removable seat back that can also extend sufficiently high to serve as a walker bar to allow very young children to stand and walk while they push the toy vehicle.

BRIEF DESCRIPTION OF THE DRAWINGS

FIG. 1 depicts the top plan view of the ride-on toy of the present invention, with the steering wheel removed, and showing the seat compartment in an open configuration.

FIG. 2 depicts the interactive figures of the present invention, showing the various shaped bases corresponding to the buttons of the seat compartment.

DETAILED DESCRIPTION OF THE INVENTION

Figure 3:
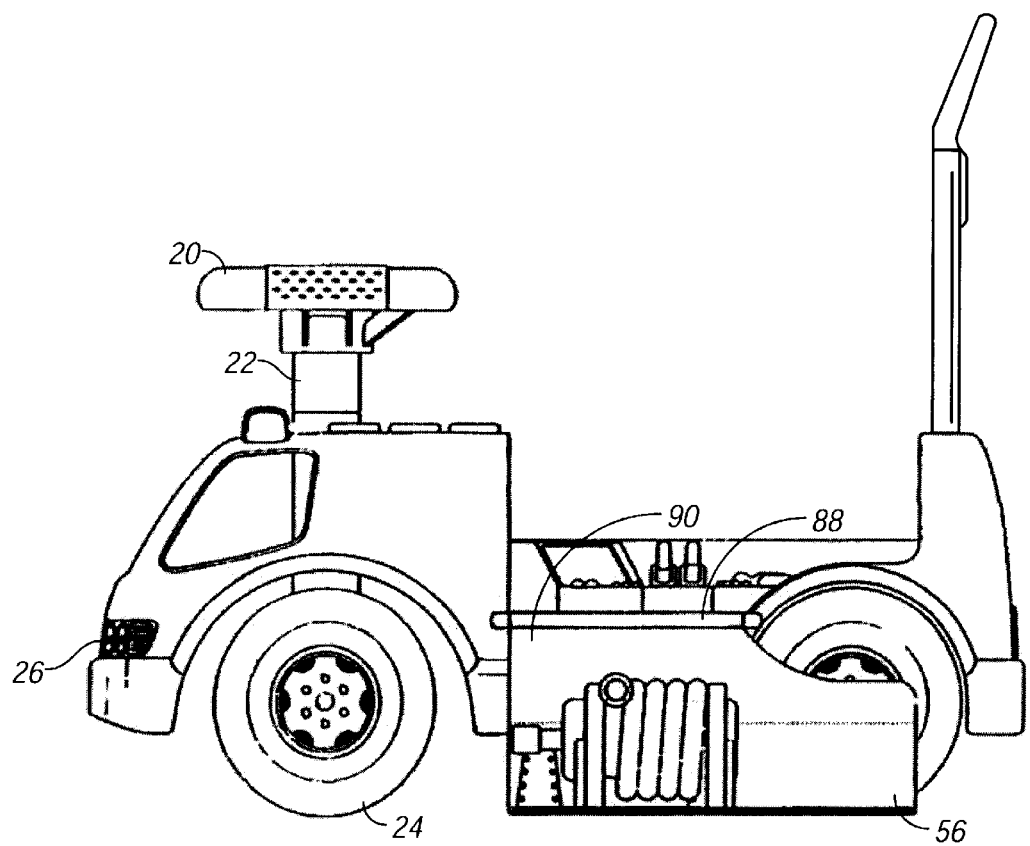
FIG. 3 depicts a right side elevation view of the ride-on toy of the present invention, with the steering wheel attached, and showing the seat compartment in an open configuration.

In accordance with the present invention, a ride-on toy interactive playset is described comprising a toy vehicle resembling an emergency vehicle, construction vehicle, farm vehicle, safari vehicle, ice cream truck or other vehicles, sized and shaped to accommodate a small child.

FIGS. 1–7 illustrate an embodiment of the present invention reflecting an emergency vehicle theme. Ride-on toy 10 has a front portion 12 and a rear portion 14. The top of front portion 12 has a dashboard 16 with an opening 18 (shown in FIG. 1) for mounting a steering wheel 20 (shown in FIGS. 3 and 5).

Figure 6:
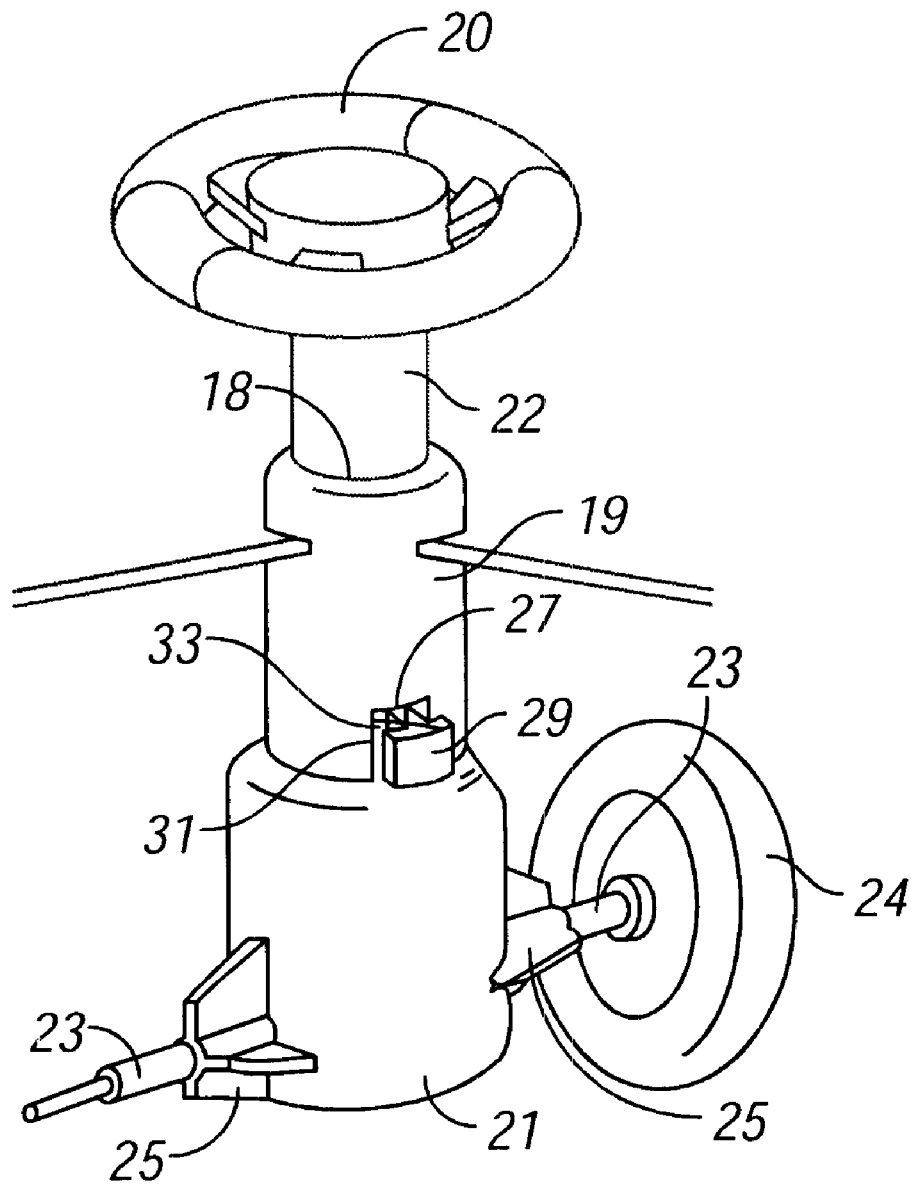
FIG. 6 depicts a partially broken view of the front portion of the ride-on toy of the present invention, showing the detail of the steering mechanism.

As shown in detail in FIG. 6, steering wheel 20 is attached to a steering column 22 which runs through and is supported by a collar 19 formed in opening 18. Steering column 22 terminates in a cup 21, which supports the axle 23 of front wheels 24. Flanges 25 on cup 21 provide additional support for axle 23. The child may steer ride-on toy 10 by rotating steering wheel 20 to turn front wheels 24 right or left.

The rotation of steering wheel 20 is restricted to limit steering of front wheels 24 to a few degrees, as in a real vehicle. The portion of collar 19 which is concealed below dashboard 16 has a slot 27. Steering column 22 is provided with a T-shaped tab 29 positioned within slot 27, that restricts the rotation of steering column 22. The gap 33 between tab 29 and the side walls 31 of slot 27 determines the range of range of rotation or steering column 22 and, therefore, steering wheel 20.

Right and left lights 26 are mounted at the front of dashboard 16. Lights 26 may be shaped to reflect the theme of ride-on toy 10. Thus, in the embodiment of FIGS. 1–5, right and left lights 26 are red and blue LEDs, shaped to resemble the warning lights of an emergency vehicle.

As shown in FIG. 1, a speaker 28 is mounted on dashboard 16 below a speaker housing 30. Speaker housing 30 is shaped to resemble a grille and may be molded as part of dashboard 16 or otherwise attached to dashboard 16. In alternative embodiments, the speaker housing may be shaped to resemble other features common to the type of vehicle represented by the ride-on toy.

Dashboard 16 is further provided with a plurality of buttons that have shapes relating to the theme of ride-on toy 10. As shown in the embodiment of the present invention depicted FIG. 1, buttons 32–50 have shapes relating to emergency vehicles. Buttons 32–36 have shapes depicting various persons that might be associated with an emergency vehicle, such as a fireman 32, a paramedic 34 and a policeman 36. Buttons 38–44 have shapes depicting other emergency vehicles, such as an ambulance 38, a fire engine 40, a police car 42 and a medical helicopter 44. Buttons 46–50 have shapes resembling controls that are commonly used in operating the type of vehicle represented by ride-on toy 10, such as a horn 46, ignition key slot 48 and gearshift 50.

Figure 8:
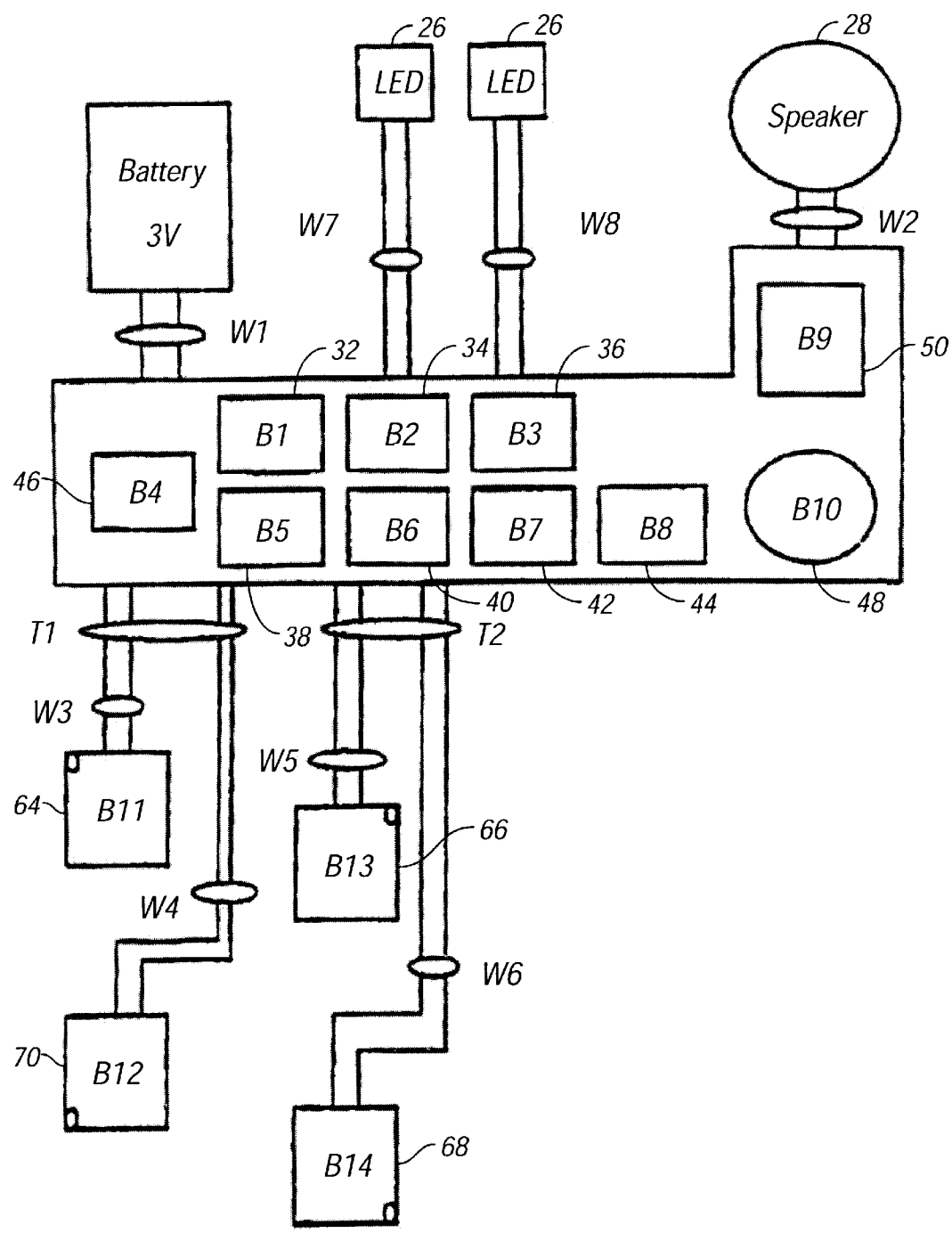
FIG. 8 depicts a general control diagram of the ride-on toy of the present invention.
Figure 9:
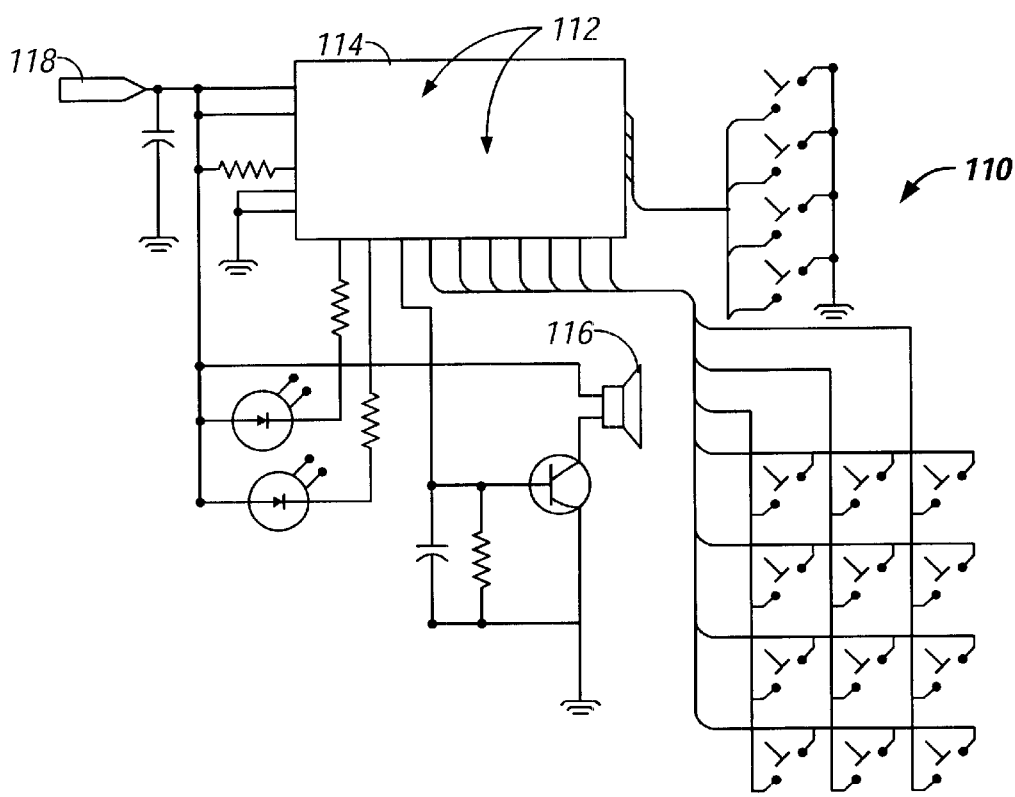
FIG. 9 depicts a circuit diagram of the control system for operating the ride-on toy of the present invention.

As set forth in Table 1, and shown in FIGS. 8 and 9, activating buttons 32–50 causes speaker 28 to play different sounds that reflect the shape of each button 32–50 and causes lights 26 to flash synchronously with the sounds.

TABLE 1

| Button No. | Trigger No. | Action |
|---|---|---|
| B1 | TG1 | Fireman #1: Look both ways before crossing the street |
| B2 | TG2 | Paramedic (Woman): Call 911 for help! |
| B3 | TG3 | Policeman #1: Don't talk to strangers |
| B4 | TG4 | Horn: Sound of horn. |
| B5 | TG5 | Ambulance: Sound of ambulance emergency siren. |
| B6 | TG6 | Fire Engine: Sound of fire engine siren. |
| B7 | TG7 | Police Car: Sound of Police car siren. |
| B8 | TG8 | Helicopter: Sound of helicopter. |
| B9 | TG9 | Gearshift: Sound of gear shift. |
| B10 | TG10 | Ignition Key: Rev sound. |
| B11 | TG11 | Fire Hydrant (Star): I spray the water! (Then the water sound.) |
| B12 | TG12 | Fire Extinguisher (Triangle): Let's put the fire out! |
| B13 | TG13 | Fireman #2 (Square): This is 911 control. How can I help you? |
| B14 | TG14 | Policeman #2 (Circle): In case of accident, call 911. |

FIG. 8 depicts a general control diagram of buttons 32–50 (B1–B10), buttons 64–70 (B11–B14), lights 26 (LED) and speaker 28. The buttons identified in FIG. 8 correspond to Table 1, describing the actions that result from activation of each button 32–50 and 64–70.

In general, activating buttons 32–36 which resemble people, causes speaker 28 to play a short phrase spoken in a male or female voice, that reflects the emergency vehicle theme of ride-on toy 10. For example, as set forth in Table 1 and shown in FIG. 8, activating button 32 (B1) shaped like a fireman causes speaker 28 to play the phrase "look both ways before crossing the street" in a male voice. Similarly, activating button 34 (B2) shaped like a female paramedic causes speaker 28 to play the phrase "call 911 for help!" in a female voice.

Activating buttons 38–44, shaped like emergency vehicles, causes speaker 28 to play sounds that are associated with the type of vehicle represented by each button. For example, as set forth in Table 1 and shown in FIG. 8, activating button 38 (B5) shaped like an ambulance causes speaker 28 to play the sound of an ambulance emergency siren. Similarly, activating button 44 (B8) shaped like a medical helicopter causes speaker 28 to play the sound of a helicopter rotor.

Activating buttons 46–50, shaped like vehicle controls, causes speaker 28 to play sounds that are associated with the type vehicle control represented by each button. For example, as set forth in Table 1 and shown in FIG. 8, activating button 46 (B4) featuring a horn symbol causes speaker 28 to play the sound of an automobile horn. Similarly, activating button 48 (B10) shaped like an ignition key slot causes speaker 28 to play the sound of an automobile starting.

In general, buttons 32–50 are activated by pressing the button. However, certain buttons may be designed to mimic the operation of actual controls. For example, button 48 is shaped to resemble an ignition key slot and is activated by twisting the button, much like an ignition key is turned. Activating button 48 causes speaker 28 to play the sound of a motor starting. Similarly, button 50 may be designed to resemble a gearshift lever (not shown) which may be toggled forward or backward, causing speaker 28 to play the sound of a motor revving.

Buttons 32–50 permit the child to develop their imagination by interacting with and playing out the theme of ride-on toy 10, while teaching the child to become more familiar with various types of objects and people.

Additional features relating to the theme of ride-on toy 10 and the operation of a vehicle may be molded into or otherwise attached to dashboard 16. For example, right and left lights 26 are red and blue alternately flashing LED's that are shaped to resemble the warning lights of an emergency vehicle. In alternate embodiments, lights 26 may be provided with a different shape and flashing sequence, or may even be replaced by signage, as is appropriate to the theme of ride-on toy 10.

Other features may be depicted on dashboard 16 by using decals or labels. A shown in FIG. 1, dashboard 16 is provided with an open space 54 for placement of a decal or label depicting additional dials, buttons or other instruments relating to the theme of ride-on toy 10.

Rear portion 14 of ride-on toy 10 has a hinged cover 56, shaped to form the top and sides of the vehicle when closed. The outer surface 58 of hinged cover 56 provides a seat for the child. In a preferred embodiment, outer surface 58 is ridged, grooved or otherwise textured to minimize the risk that the child will accidentally slip off ride-on toy 10. In alternative embodiments, outer surface 58 may be molded to provide a more comfortably shaped seat or to further reflect the theme of ride-on toy 10.

Figure 7:
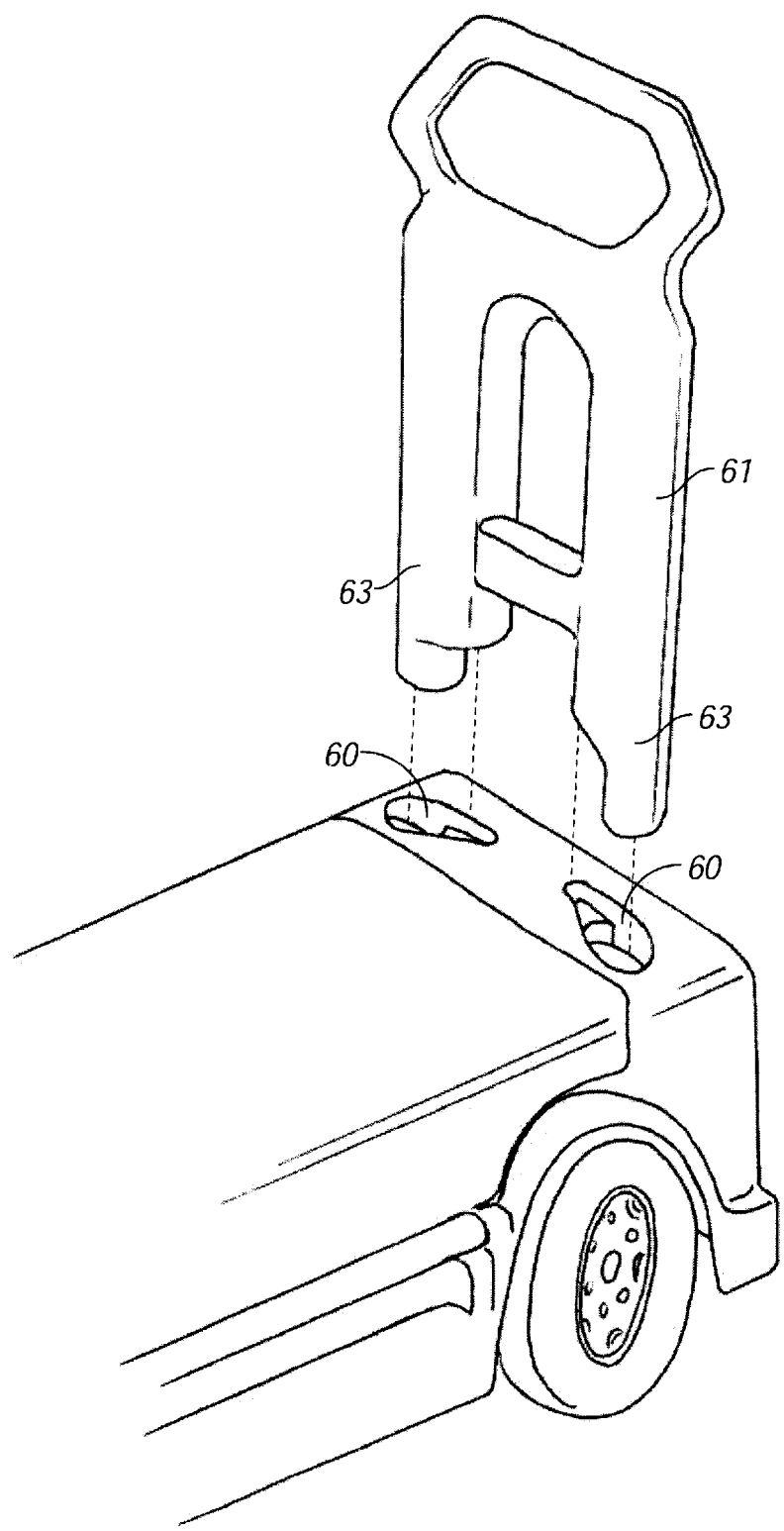
FIG. 7 depicts a perspective view of the rear portion of the ride-on toy of the present invention, showing the attachment of the seat back.

As shown in FIGS. 1 and 7, the back of rear portion 14 is provided with slots 60 for removably attaching a seat back 61. The bottom portion 63 of seat back 61 has a complementary shape to slots 60, allowing bottom portion 63 to be inserted into and frictionally retained within slots 60. In a preferred embodiment, seat back 61 extends sufficiently high to serve as a walker bar to allow very young children to stand as they push ride-on toy 10.

As shown in FIG. 1, hinged cover 56 conceals a compartment 62 within ride-on toy 10, that contains buttons 64–70 and other features relating to the theme of ride-on toy 10. Each button 64–70 is in the shape of a figure relating to the theme of ride-on toy 10. For example, as shown in FIG. 2, buttons 64–70 are shaped to resemble a fire hydrant (64), a fireman (66), a policeman (68) and a fire extinguisher (70). Each button 64–70 has a differently shaped base 64a–70a. For example, buttons 64–70 have bases shaped like a star (64a), a square (66a), a circle (66a) and a triangle (70a).

Figure 4:
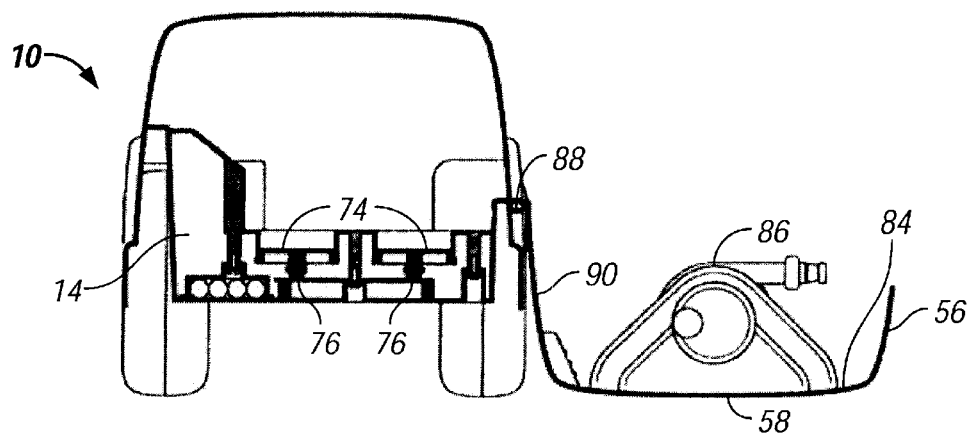
FIG. 4 depicts a front elevation section view of the ride-on toy of the present invention, with the steering wheel removed, showing the seat compartment in an open configuration.
Figure 5:
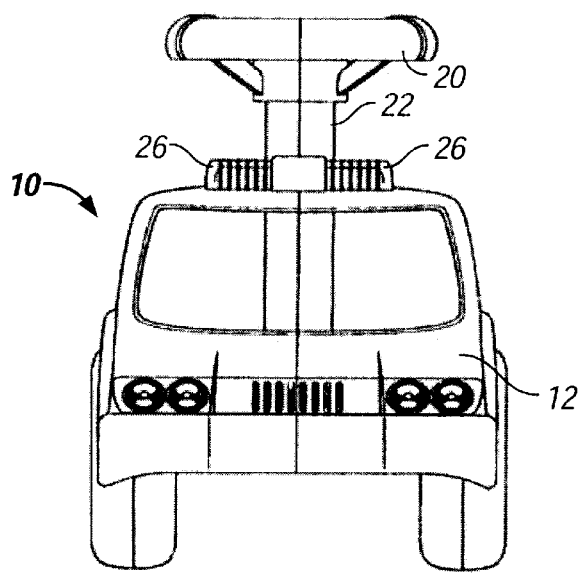
FIG. 5 depicts a front elevation view of the ride-on toy of the present invention, with the steering wheel attached, showing the seat compartment in a closed configuration.

The bottom 72 of inner compartment 62 is provided with a plurality of openings 64b–70b, each shaped to removably receive one of bases 64a–70a of buttons 64–70. As shown in FIG. 4, each opening 64b–70b has a bottom 74 connected to a spring-loaded switch 76, such that buttons 64–70 may be activated by placing bases 64a–70a in the appropriate openings 64b–70b and pressing down on bottoms 74 to close switches 76. For example button 64 resembling a fire hydrant may be activated by inserting star-shaped base 64a into star-shaped opening 64b and then pressing down on bottom 74 to close switch 76.

As set forth in Table 1 and shown in FIG. 8, activating buttons 46–50, shaped like various figures, causes speaker 28 to play sounds that are associated with the figure represented by each button and causes lights 26 to flash synchronously with the sounds. For example, activating button 64 (B11) shaped like a fire hydrant causes speaker 28 to play the phrase "I spray the water!" in a male voice, followed by the sound of spraying water. Similarly, activating button 66 (B13) shaped like a fireman causes speaker 28 to play the phrase "this is 911 control . . . how can I help you?" in a male voice.

Buttons 64–70 provide a learning tool for teaching children to recognize and match various shapes, as well as reinforcing the child's familiarity and interaction with various types of objects and people. In alternative embodiments, a variety of shapes may be used in connection with bases 64*a*–70*a* of buttons 64–70, such as a rectangle, hexagon, octagon, and diamond.

Additional features relating to the theme of ride-on toy 10 and the operation of a vehicle may be molded into or otherwise attached to the interior of compartment 62, such as the workstation 78 shown in FIG. 1. Workstation 78 may be characterized by applying various decals 80, 82 that reflect the theme of ride-on toy 10. For example, decals 80, 82 depict emergency equipment and a video screen, in keeping with the emergency vehicle theme of ride-on toy 10.

Other features may be attached to or otherwise depicted on the inner surface 84 of hinged cover 56. A shown in FIG. 1, a fire hose 86 is attached to the inner surface 84 of hinged cover 56, in keeping with the emergency vehicle theme of ride-on toy 10.

As shown in FIGS. 1, 3 and 4, hinged cover 56 is attached to the body of ride-on toy 10 by a hinge 88 that runs along the side of ride-on toy 10. Wall 90 of hinged cover 56 is sufficiently long, such that when hinged cover 56 is fully open, top surface 58 is level with the bottom of wheels 24 and rests on the ground or other surface. This arrangement provides support for hinged cover 56 to prevent ride-on toy 10 from accidentally tipping over when hinged cover 56 is opened, and permits ready access to fire hose 86 or other features on inner surface 84. In alternative embodiments, hinge 88 may run along the width of ride-on toy 10, such that hinged cover 56 opens toward the front or back of ride-on toy 10, rather than to the side.

FIG. 9 depicts a general circuit diagram of the control system of the present invention. A plurality of buttons 110 are connected to corresponding trigger inputs 112 of a programmable speech synthesizer chip 114, such as a W583 speech synthesizer chip (Winbond Electronics Corp., Taiwan). Activating each button 110 sends a signal to a corresponding trigger input 114, directing speech synthesizer chip 114 to actuate speaker 116 to play a preprogrammed sound and to enable synchronous flashing of LED 118.

A power supply of 3 V, two AA sized batteries, is required for the control unit of speech synthesizer chip 114. As shown in FIG. 1, the batteries are stored in a battery compartment concealed by a cover 52 on dashboard 16. Cover 52 is shaped to resemble the radio handset of an emergency vehicle, in keeping with the theme of ride-on toy 10. In alternate embodiments, cover 52 may be shaped to resemble a cell phone or other device appropriate for the theme of ride-on toy 10.

It is presently preferred to construct dashboard 16 as a separate element of ride-on toy 10. Thus, manufacturing costs can be reduced by using the same vehicle body to construct a series of differently themed ride-on toys by substituting various dashboards 16 having differently shaped or configured buttons 32–44, lights 26, open spaces 54 and covers 52. Buttons 64–70, decals 80, 82 and hinged cover 56 may also be varied to reflect different ride-on toy themes.

In alternate embodiments, ride-on toy 10 may be shaped and configured to resemble a construction vehicle and buttons 32–44 and 64–70 are shaped to resemble construction workers, a policeman, a back hoe, a dump truck, a crane, a bulldozer, a safety cone and a pile of bricks. In a farm vehicle embodiment, buttons 32–44 and 64–70 are shaped to resemble farm workers, a truck, a tractor, a horse, a cow, a pig, and a sheep. In a safari vehicle embodiment, buttons 32–44 and 64–70 are shaped to resemble safari guides, an elephant, a giraffe, a crocodile, a lion, a monkey, and a zebra. In an ice cream truck embodiment, buttons 32–44 and 64–70 are shaped to resemble an ice cream truck driver, a policeman, customers, and various types of ice cream treats. In each alternative embodiment, activating buttons 32–44 and 64–70 produces a sound such as a phrase or noise that reflects the shape of the button. Similarly, in alternate embodiments, button 46 may be configured to cause speaker 26 to play a song or tune that is associated with the theme of ride-on toy 10.

Buttons 64–70 may also be used as play figures in connection with other toys apart from the present invention. For example, button 68 resembling a policeman may be used with a toy police car having a round opening at the driver's position, shaped to receive base 68*a*.

It will be apparent to those skilled in the art that changes and modifications may be made in the embodiments illustrated herein, without departing from the spirit and the scope of the invention. Thus, the invention is not to be limited to the particular forms herein shown and described except insofar as indicated by the scope of the appended claims.

What is claimed is:

1. A ride-on toy resembling a vehicle, comprising:
 a front portion with a dashboard and a rear portion with a seat, said seat comprising a hinged cover that defines a seat compartment;
 at least one button in said seat compartment, the button having a base removably seated within an opening in said seat compartment, said base and said opening having complimentary shapes, said compartment button shaped to resemble a person or object associated with the use or operation of said vehicle;
 at least one button on said dashboard;
 an electronically programmed chip in said ride-on toy for responding to activation of said compartment button and said dashboard button; and
 a light emitting device and a speaker operable by said chip in response to activation of said compartment button or said dashboard button, said chip programmed to actuate said speaker to play sounds associated with said person or object represented by said shapes of said button.

2. The ride-on toy of claim 1, said vehicle is an emergency vehicle and said compartment button is shaped to resemble emergency personnel and emergency vehicles.

3. The ride-on toy of claim 1, wherein said vehicle is a construction vehicle and said compartment button is shaped to resemble construction workers, a policeman, and construction vehicles.

4. The ride-on toy of claim 1, wherein said vehicle is a farm vehicle and said compartment button is shaped to resemble farm workers, farm vehicles, and farm animals.

5. The ride-on toy of claim 1, wherein said vehicle is a safari vehicle and said compartment button is shaped to resemble safari guides and jungle animals.

6. The ride-on toy of claim 1, wherein said vehicle is an ice cream truck and said compartment button is shaped to resemble an ice cream truck driver, a policeman, a customer or an ice cream treat.

7. A ride-on toy, comprising:
 a front portion with a dashboard and a rear portion with a hinged cover that forms a seat and defines a seat compartment;
 a first series of buttons on said dashboard;

a second series of buttons in said seat compartment, each button in said second series of buttons having a base removably seated within an opening in said seat compartment, said base and said opening having complementary shapes;

an electronically programmed chip in said ride-on toy for responding to activation of said first and second series of buttons;

a light emitting device and a speaker operable by said chip in response to activation of said first and second series of buttons.

8. The ride-on toy of claim 1 or 7, wherein the rear portion has a removable member shaped to form a seat back or to provide a support for a child to hold while standing and pushing the toy.

9. An interactive playset resembling a vehicle, comprising:

a body with wheels and a dashboard;

a button on said dashboard;

a button removably seated within an opening in said body, said button and said opening having complementary shapes, and said button shaped to resemble a person or object associated with the use or operation of said vehicle;

an electronically programmed chip for responding to activation of said dashboard button and said compartment button; and a speaker operable by said chip in response to activation of said dashboard button or said compartment button, said chip programmed to actuate said speaker to play sounds associated with said person or object represented by said shape of said dashboard button and said compartment button.

10. The interactive playset of claim 9, wherein said compartment button has a base, said base and said opening having complementary shapes.

11. The interactive playset of claim 10, wherein said base and said opening have shapes selected from a group consisting of a star, square, circle, triangle, rectangle, hexagon, octagon, diamond, and heart.

12. The interactive playset of claim 9, wherein said body has a lid that defines an enclosed space within said body.

13. The interactive playset of claim 12, wherein said compartment button is removably seated in an opening within said enclosed space, said compartment button and said opening having complementary shapes.

14. The interactive playset of claim 13, wherein said compartment button has a base, said base and said opening having complementary shapes.

15. The interactive playset of claim 14, wherein said base and said opening have shapes selected from a group consisting of a star, square, circle, triangle, rectangle, hexagon, octagon, diamond, and heart.

16. A ride-on toy, comprising:

a front portion with a dashboard and a rear portion with a seat;

said seat comprising a hinged cover that defines a seat compartment;

at least one button in said seat compartment having a base removably seated with an opening in said seat compartment, said base and said opening having complimentary shapes;

at least one button on said dashboard;

an electronically programmed chip in said ride-on toy for responding to activation of said compartment button and dashboard button; and a light emitting device and a speaker operable by said chip in response to activation of said compartment button or said dashboard button.

17. The ride-on toy of claim 16, wherein the seat compartment has a plurality of buttons, and the base and complementary opening are shapes selected from a group comprising a star, square, circle, triangle, rectangle, hexagon, octagon, and diamond.

18. The ride-on toy of claim 16, wherein said compartment button is concealed within the seat compartment when said compartment is closed.

* * * * *

UNITED STATES PATENT AND TRADEMARK OFFICE
CERTIFICATE OF CORRECTION

| | | |
|---|---|---|
| PATENT NO. | : 6,474,659 B1 | Page 1 of 1 |
| APPLICATION NO. | : 09/751134 | |
| DATED | : November 5, 2002 | |
| INVENTOR(S) | : Jack M. Horchler and Stephen Leung | |

It is certified that error appears in the above-identified patent and that said Letters Patent is hereby corrected as shown below:

Column 7,
Line 21, "a button removably seated" should be -- a compartment button removably seated --.

Signed and Sealed this
Fifth Day of July, 2011

David J. Kappos
*Director of the United States Patent and Trademark Office*